(12) United States Patent
Asanuma (10) Patent No.: US 11,897,598 B2
(45) Date of Patent: Feb. 13, 2024

(54) AIRCRAFT

(71) Applicant: HONDA MOTOR CO., LTD., Tokyo (JP)

(72) Inventor: Masahiko Asanuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/697,025

(22) Filed: Mar. 17, 2022

(65) Prior Publication Data

US 2022/0306289 A1    Sep. 29, 2022

(30) Foreign Application Priority Data

Mar. 29, 2021 (JP) ................. 2021-054480

(51) Int. Cl.
| | | |
|---|---|---|
| *B64C 13/16* | (2006.01) | |
| *B64C 27/58* | (2006.01) | |
| *B64C 27/57* | (2006.01) | |
| *B64C 27/82* | (2006.01) | |
| *B64D 27/24* | (2006.01) | |
| *B64C 29/00* | (2006.01) | |

(52) U.S. Cl.
CPC .............. *B64C 13/16* (2013.01); *B64C 27/57* (2013.01); *B64C 27/58* (2013.01); *B64C 27/82* (2013.01); *B64D 27/24* (2013.01); *B64C 29/0025* (2013.01)

(58) Field of Classification Search
CPC ............ B64C 2027/8236; B64C 13/16; B64C 2027/8272
See application file for complete search history.

(56) References Cited

U.S. PATENT DOCUMENTS

| | | | | |
|---|---|---|---|---|
| 3,222,012 A | * | 12/1965 | Piasecki .................. | B64C 27/82 244/51 |
| 3,260,482 A | * | 7/1966 | Stroukoff ................ | B64C 27/82 244/17.19 |
| 4,726,547 A | * | 2/1988 | Zimmer .................. | B64C 27/82 244/6 |
| 2009/0216392 A1 | * | 8/2009 | Piasecki .................. | B64C 27/82 244/17.19 |
| 2020/0115045 A1 | | 4/2020 | Mermoz et al. | |
| 2020/0407055 A1 | * | 12/2020 | Mores .................... | B64U 70/60 |

* cited by examiner

*Primary Examiner* — Timothy D Collins
*Assistant Examiner* — Terri L Filosi
(74) *Attorney, Agent, or Firm* — Amin, Turocy & Watson, LLP

(57) ABSTRACT

An aircraft includes a plurality of takeoff and landing rotors each generating a first airflow below the takeoff and landing rotor, and a cruise rotor generating a second airflow behind the cruise rotor, the plurality of takeoff and landing rotors including a rear rotor disposed behind the cruise rotor. The aircraft further includes an airflow deflection mechanism capable of changing a direction of the second airflow, and a controller for controlling the airflow deflection mechanism to suppress interference between the first airflow generated by the rear rotor and the second airflow.

5 Claims, 8 Drawing Sheets

AIRCRAFT

CROSS-REFERENCE TO RELATED APPLICATIONS

This application is based upon and claims the benefit of priority from Japanese Patent Application No. 2021-054480 filed on Mar. 29, 2021, the contents of which are incorporated herein by reference.

BACKGROUND OF THE INVENTION

Field of the Invention

The present invention relates to an aircraft including a plurality of internal combustion engines.

Description of the Related Art

US 2020/0115045 A1 discloses an aircraft referred to as an electric vertical take-off and landing aircraft (eVTOL aircraft). This aircraft includes a plurality of takeoff and landing rotors and a plurality of cruise rotors. Each of the plurality of takeoff and landing rotors is disposed on one of the left and right sides of a fuselage. Each of the plurality of cruise rotors is disposed above a rear wing. The eVTOL aircraft climbs vertically after takeoff. After reaching a certain height, the eVTOL aircraft starts moving forward. Further, the eVTOL aircraft stops moving forward, descends vertically, and lands. The eVTOL aircraft uses both the takeoff and landing rotors and the cruise rotors at the time of starting forward movement and stopping forward movement.

SUMMARY OF THE INVENTION

In the aircraft disclosed in US 2020/0115045 A1, some of the plurality of takeoff and landing rotors are disposed behind and below the cruise rotors. When the takeoff and landing rotors and the cruise rotors are used together in this aircraft, an airflow generated above the takeoff and landing rotors and an airflow generated behind the cruise rotors interfere with each other. This may adversely affect the lift generated by the takeoff and landing rotors and the thrust generated by the cruise rotors.

An object of the present invention is to solve the aforementioned problem.

According to an aspect of the present invention, provided is an aircraft comprising: a fuselage; a wing connected to the fuselage; a plurality of takeoff and landing rotors each configured to generate a first airflow below the takeoff and landing rotor in order for the aircraft to perform vertical movement; a cruise rotor configured to generate a second airflow behind the cruise rotor in order for the aircraft to perform forward movement, the plurality of takeoff and landing rotors including a rear rotor disposed behind the cruise rotor, the aircraft further comprising: an airflow deflection mechanism configured to change a direction of the second airflow; and a controller configured to control the airflow deflection mechanism to suppress interference between the first airflow generated by the rear rotor and the second airflow during at least one of a transition from the vertical movement to the forward movement or a transition from the forward movement to the vertical movement.

According to the present invention, it is possible to suppress interference between the first airflow generated by the takeoff and landing rotors and the second airflow generated by the cruise rotors.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

1. Overall Configuration of Aircraft 10

An overall configuration of an aircraft 10 will be described with reference to FIG. 1. In the present embodiment, an electric vertical take-off and landing aircraft is assumed as the aircraft 10. Electric vertical take-off and landing aircraft are referred to as eVTOL aircraft. The eVTOL aircraft generates lift and thrust by using rotors with electric motors as their drive sources. In this specification, a vertically upward direction is referred to as an upward direction. A vertically downward direction is referred to as a downward direction. Further, a moving direction of the aircraft 10 when the aircraft 10 moves (flies) in the horizontal direction is referred to as a forward direction. A direction opposite to the forward direction is referred to as a rearward direction. Further, when viewed from the aircraft 10 traveling forward, the right direction is defined as a right direction, and the left direction is defined as a left direction. Further, the plan view of the aircraft 10 refers to a state in which the aircraft 10 is viewed from above. The front view of the aircraft 10 refers to a state in which the aircraft 10 is viewed from the front.

The aircraft 10 includes a fuselage 12, a front wing 14, a rear wing 16, two booms 18, eight takeoff and landing rotors 20, and two cruise rotors 22. A central axis A of the fuselage 12 extends in the front-rear direction. The structure of the aircraft 10 is bilaterally symmetrical about a vertical plane including the central axis A. As shown in FIG. 1, in plan view, the central axis A overlaps with the center of gravity G of the aircraft 10.

The fuselage 12 is long in the front-rear direction. The fuselage 12 has a fuselage front portion 12$f$ and a fuselage rear portion 12$r$. The fuselage front portion 12$f$ is located in front of the center of gravity G. The fuselage rear portion 12$r$ is located behind the center of gravity G. The fuselage front portion 12$f$ becomes narrower toward the front end. The fuselage rear portion 12$r$ becomes narrower toward the rear end. The fuselage 12 has a main body. The fuselage 12 may include the main body, and a fairing that covers a part of the main body. The main body and the fairing are referred to herein as the fuselage 12. A front portion of the fuselage 12 is referred to as the fuselage front portion 12f. A rear portion of the fuselage 12 is referred to as the fuselage rear portion 12r.

The front wing 14 is connected to an upper portion of the fuselage front portion 12f. The front wing 14 generates lift when the aircraft 10 moves forward. The front wing 14 includes a front wing main body 26, and left and right elevators 28. The front wing main body 26 extends to the left and right from the center of the fuselage 12. The front wing main body 26 is also referred to as a horizontal stabilizer. The left and right elevators 28 are disposed at the tailing edge of the front wing 14.

The rear wing 16 is connected to an upper portion of the fuselage rear portion 12r via a pylon 32. The rear wing 16 generates lift when the aircraft 10 moves forward. The rear wing 16 includes a rear wing main body 34, left and right elevons 36, and a pair of vertical tails 38. The rear wing main body 34 extends to the left and right from the center of the fuselage 12. Each elevon 36 is disposed at the tailing edge of the rear wing 16. The left vertical tail 38 is disposed at the left wing tip of the rear wing 16. The right vertical tail 38 is disposed at the right wing tip of the rear wing 16. Each vertical tail 38 includes a tail main body 42 and a rudder (not shown). The tail main body 42 is also referred to as a vertical stabilizer. The rudder is disposed at the tailing edge of the vertical tail 38.

The area of the rear wing 16 is larger than the area of the front wing 14. Further, the width of the rear wing 16 is longer than the width of the front wing 14. With such a configuration, the lift generated by the rear wing 16 when the aircraft 10 moves forward is greater than the lift generated by the front wing 14. That is, the rear wing 16 functions as a main wing of the aircraft 10. The rear wing 16 is a swept wing. On the other hand, the front wing 14 functions as a canard wing of the aircraft 10.

The lift generated by the rear wing 16 when the aircraft 10 moves forward and the lift generated by the front wing 14 when the aircraft 10 moves forward may be substantially the same. The ratio between the lift generated by the front wing 14 and the lift generated by the rear wing 16 is appropriately determined depending on the position of the center of gravity G, the attitude of the airframe during cruising, and the like. In addition, the size of the front wing 14 and the size of the rear wing 16 are determined in order to generate desired lift. In this specification, the size of the wing is a wing area, a length, or the like.

The two booms 18 include a right boom 18 and a left boom 18. The right boom 18 is disposed on the right side of the fuselage 12. The left boom 18 is disposed on the left side of the fuselage 12. The two booms 18 form a pair. The two booms 18 are arranged bilaterally symmetrically about the vertical plane including the central axis A. The two booms 18 are connected to the front wing 14 and the rear wing 16. The two booms 18 are connected to the fuselage 12 via the front wing 14 and the rear wing 16. The respective two booms 18 function as support members that support four takeoff and landing rotors 20.

The right boom 18 is a bar member. The right boom 18 extends from the front toward the rear. The right boom 18 is curved in an arc shape toward the right side. The right boom 18 may be a straight bar member. The right boom 18 is connected to the right wing tip of the front wing 14. The right boom 18 is connected to the right wing of the rear wing 16. The right boom 18 is located on the left side of the right elevon 36 of the rear wing 16. The front end of the right boom 18 is located in front of the front wing 14. The rear end of the right boom 18 is located behind the rear wing 16.

The left boom 18 is a bar member. The left boom 18 extends from the front toward the rear. The left boom 18 is curved in an arc shape toward the left side. The left boom 18 may be a straight bar member. The left boom 18 is connected to the left wing tip of the front wing 14. The left boom 18 is connected to the left wing of the rear wing 16. The left boom 18 is located on the right side of the left elevon 36 of the rear wing 16. The front end of the left boom 18 is located in front of the front wing 14. The rear end of the left boom 18 is located behind the rear wing 16.

Figure 3:
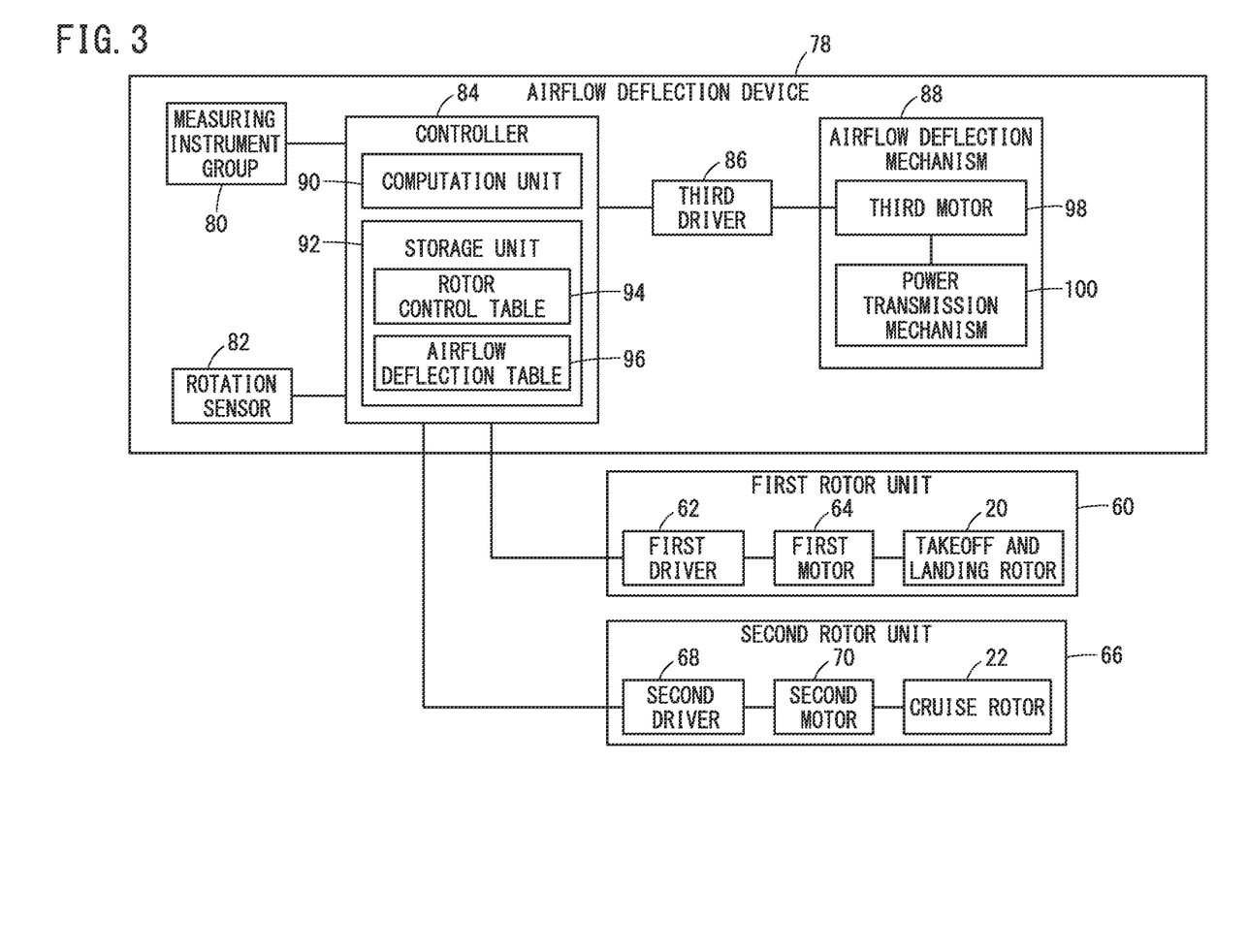
FIG. 3 is a block diagram showing an airflow deflection device, a first rotor unit, and a second rotor unit.

Each of the eight takeoff and landing rotors 20 includes a mast (not shown), a hub (not shown), and a plurality of blades 46. The mast is connected to an output shaft portion of a first motor 64 (FIG. 3). The hub is connected to the mast. The plurality of blades 46 are connected to the hub. The mast is arranged in parallel with the vertical direction. The mast is rotatable about a rotation axis 20A extending in the vertical direction. The plurality of blades 46 are located above the booms 18, the front wing 14, and the rear wing 16. The pitch angle of the blades 46 is variable. With such a structure, the takeoff and landing rotors 20 rotate about the rotation axis 20A and generate lift. A first rotor unit 60 (FIG. 3) includes one takeoff and landing rotor 20, the first motor 64, and a first driver 62 (FIG. 3) for driving the motor. Note that the first rotor unit 60 may include one or more batteries.

The eight takeoff and landing rotors 20 include four takeoff and landing rotors 20a to 20d on the right side, and four takeoff and landing rotors 20a to 20d on the left side. The right-side takeoff and landing rotors 20a to 20d are disposed on the right side of the fuselage 12. The left-side takeoff and landing rotors 20a to 20d are disposed on the left side of the fuselage 12. The right-side takeoff and landing rotors 20a to 20d are supported by the right boom 18. The left-side takeoff and landing rotors 20a to 20d are supported by the left boom 18. The right-side takeoff and landing rotors 20a to 20d and the left-side takeoff and landing rotors 20a to 20d are paired, respectively. The position of the right-side takeoff and landing rotor 20a in the front-rear direction and the position of the left-side takeoff and landing rotor 20a in the front-rear direction are the same. The same applies to the left and right-side takeoff and landing rotors 20b to 20d.

Figure 1:
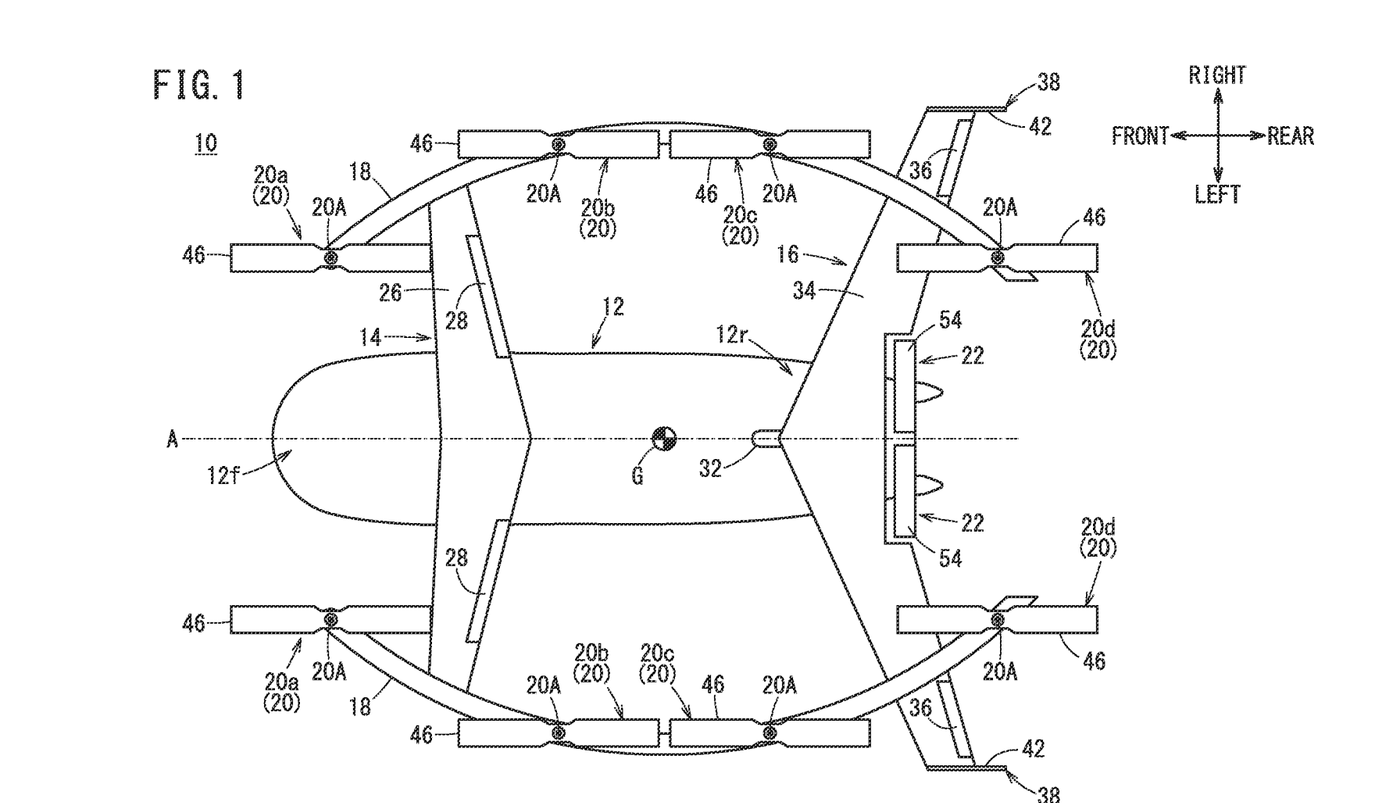
FIG. 1 is a plan view of an aircraft.

As shown in FIG. 1, toward the rear, the pair of takeoff and landing rotors 20a, the front wing 14, the pair of takeoff and landing rotors 20b, the pair of takeoff and landing rotors 20c, the rear wing 16, and the pair of takeoff and landing rotors 20d are disposed in this order. The left and right takeoff and landing rotors 20d are disposed behind and above the cruise rotors 22.

Each of the two cruise rotors 22 includes a mast (not shown), a hub (not shown), and a plurality of blades (not shown). The mast is connected to an output shaft portion of a second motor 70 (FIG. 3). The hub is connected to the mast. The plurality of blades are connected to the hub. A cylindrical duct 54 is provided around the cruise rotor 22. The mast is disposed below the rear wing 16. The mast is disposed parallel to the front-rear direction. The mast is rotatable about a rotation axis extending in the front-rear direction. With such a structure, the cruise rotors 22 rotate about the rotation axis extending in the front-rear direction and generate thrust. A second rotor unit 66 (FIG. 3) includes one cruise rotor 22, the second motor 70, and a second driver 68 (FIG. 3) for driving the motor. Note that the second rotor unit 66 may include one or more batteries.

The two cruise rotors 22 are disposed on the fuselage rear portion 12r. The two cruise rotors 22 are located on the left side of the right-side takeoff and landing rotors 20a to 20d and on the right side of the left-side takeoff and landing rotors 20a to 20d. The two cruise rotors 22 are located behind the pair of takeoff and landing rotors 20c and in front of the pair of takeoff and landing rotors 20d. The rotation axes of the two cruise rotors 22 are located below the blades 46 of the eight takeoff and landing rotors 20.

The positions of the two cruise rotors 22 in the front-rear direction coincide with each other. The positions of the two cruise rotors 22 in the vertical direction also coincide with each other. The two cruise rotors 22 are arranged side by side in the left-right direction. The right-side cruise rotor 22 is disposed to the right of the vertical plane including the central axis A of the fuselage 12. The right-side cruise rotor 22 is supported by the right wing of the rear wing 16. The left-side cruise rotor 22 is disposed to the left of the vertical plane including the central axis A of the fuselage 12. The left-side cruise rotor 22 is supported by the left wing of the rear wing 16.

The right-side takeoff and landing rotor 20d is disposed so as to be separated (offset) from the central axis A in the right direction by a first distance. The left-side takeoff and landing rotor 20d is disposed so as to be separated from the central axis A in the left direction by the first distance. The right-side cruise rotor 22 is disposed so as to be separated from the central axis A in the right direction by a second distance. The left-side cruise rotor 22 is disposed so as to be separated from the central axis A in the left direction by the second distance. The second distance is less than the first distance. That is, the left-side cruise rotor 22 is disposed closer to the central axis A than the left-side takeoff and landing rotor 20d. The right-side cruise rotor 22 is disposed closer to the central axis A than the right-side takeoff and landing rotor 20d.

2. Airflow Deflection Device 78

Figure 2:
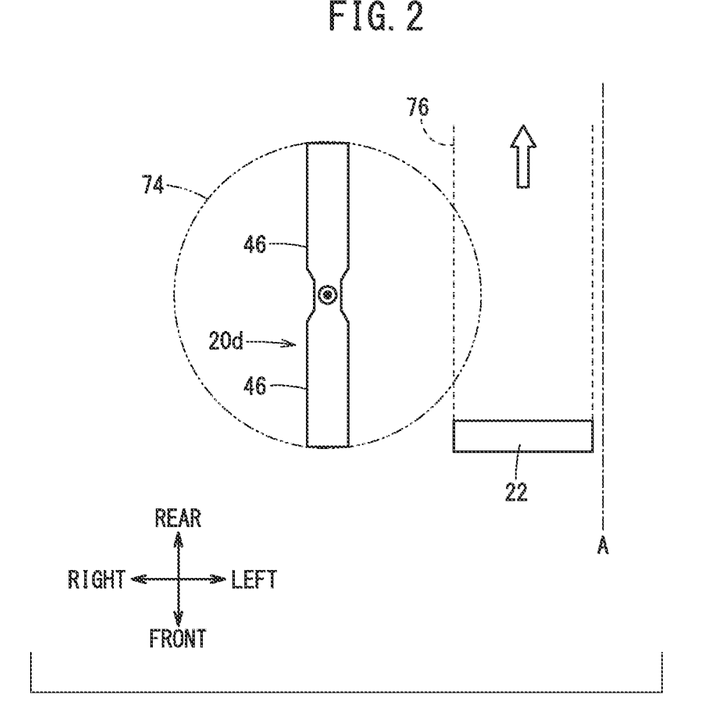
FIG. 2 is a diagram showing a first airflow generated by a right-side takeoff and landing rotor and a second airflow generated by a right-side cruise rotor.

FIG. 2 is a diagram showing a first airflow 74 generated by the right-side takeoff and landing rotor 20d, and a second airflow 76 generated by the right-side cruise rotor 22. As shown in FIG. 2, the right-side takeoff and landing rotor 20d and the right-side cruise rotor 22 are disposed so as to be separated from the central axis A to the right of the fuselage 12 by predetermined distances. When the takeoff and landing rotor 20d rotates, the first airflow 74 is generated below the takeoff and landing rotor 20d. When the cruise rotor 22 rotates, the second airflow 76 is generated behind the cruise rotor 22. When the takeoff and landing rotor 20d and the cruise rotor 22 are used together, the first airflow 74 and the second airflow 76 interfere with each other. The same applies to the left-side takeoff and landing rotor 20d and the left-side cruise rotor 22 as to the right-side takeoff and landing rotor 20d and the right-side cruise rotor 22.

FIG. 3 is a block diagram showing an airflow deflection device 78, the first rotor unit 60, and the second rotor unit 66. The aircraft 10 includes the airflow deflection device 78. The airflow deflection device 78 includes a measuring instrument group 80, a rotation sensor 82, a controller 84, a third driver 86, and an airflow deflection mechanism 88. The airflow deflection device 78 appropriately changes the traveling direction of the second airflow 76 in order to suppress interference between the first airflow 74 and the second airflow 76. In the present specification, an angle at which the traveling direction of the second airflow 76 is inclined with respect to the direction in which the central axis A of the fuselage 12 extends is referred to as an azimuth θd. The direction in which the central axis A extends coincides with the axial direction of the fuselage 12.

The measuring instrument group 80 includes various measuring instruments that detect the flight state of the aircraft 10. For example, the measuring instrument group 80 includes a sensor that measures an operation amount of an operation instrument operated by a pilot, for example, a control stick. In addition, the measuring instrument group 80 may include a measuring instrument that measures the moving speed of the aircraft 10 in the horizontal direction. The measuring instrument group 80 may include a measuring instrument that measures the altitude of the aircraft 10. Further, the measuring instrument group 80 may include a measuring instrument that measures at least one of yaw, pitch, or roll of the airframe. Further, the measuring instrument group 80 may include a measuring instrument that measures the wind speed and the wind direction. Each measuring instrument of the measuring instrument group 80 periodically transmits a measurement value to the controller 84.

The rotation sensor 82 is, for example, a rotary encoder. The rotation sensor 82 measures a rotation angle θr of a third motor 98 included in the airflow deflection mechanism 88. The rotation angle θr of the third motor 98 is proportional to the azimuth θd of the second airflow 76. The rotation sensor 82 transmits the measured rotation angle θr to the controller 84. In the present embodiment, the rotation angle θr is 0 when the azimuth θd is 0.

The controller 84 controls the rotation of the takeoff and landing rotors 20. The controller 84 controls the rotation of the cruise rotors 22. The controller 84 control the pitch of the airframe using the takeoff and landing rotors 20 and the cruise rotors 22. The controller 84 controls the operation of the airflow deflection mechanism 88. The controller 84 is, for example, an electronic control unit (ECU). The ECU includes a computation unit 90, a storage unit 92, an input/output unit (not shown), and the like.

The computation unit 90 includes a processor such as, for example, a CPU. The computation unit 90 performs various processes by executing programs stored in the storage unit 92. The computation unit 90 may include an integrated circuit such as an ASIC or an FPGA. Further, the computation unit 90 may include an electronic circuit including a discrete device. The computation unit 90 performs calculation using the measurement value of each measuring instrument, the measurement value of the rotation sensor 82, information stored in the storage unit 92, and the like. The computation unit 90 outputs command signals to the first driver 62, the second driver 68, and the third driver 86.

Figure 4:
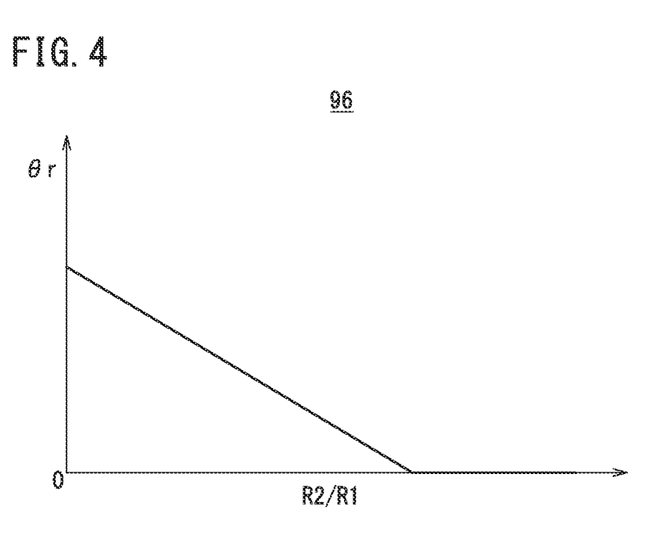
FIG. 4 is a diagram showing an airflow deflection table.

The storage unit 92 includes, for example, a volatile memory and a nonvolatile memory. Examples of the volatile memory include a RAM and the like. Examples of the nonvolatile memory include, for example, a ROM, a flash memory, and the like. The nonvolatile memory stores programs executed by the computation unit 90. The nonvolatile memory stores various types of information input in advance by a user. In the present embodiment, the nonvolatile memory stores a rotor control table 94 and an airflow deflection table 96. The rotor control table 94 associates the measurement value of each measuring instrument with a target rotational speed R1 of the first motor 64. Further, the rotor control table 94 associates the measurement value of each measuring instrument with a target rotational speed R2 of the second motor 70. The airflow deflection table 96 associates the target rotational speed R1 of the first motor 64, the target rotational speed R2 of the second motor 70, and the rotation angle θr of the third motor 98. For example, as shown in FIG. 4, the airflow deflection table 96 associates a ratio (target rotational speed R2/target rotational speed R1) with the rotation angle θr. The storage unit 92 also stores the latest rotation angle θr.

The third driver 86 is a drive circuit for the third motor 98 of the airflow deflection mechanism 88. The third driver 86 supplies electric power to the third motor 98 based on a command signal output by the controller 84.

Figure 5:
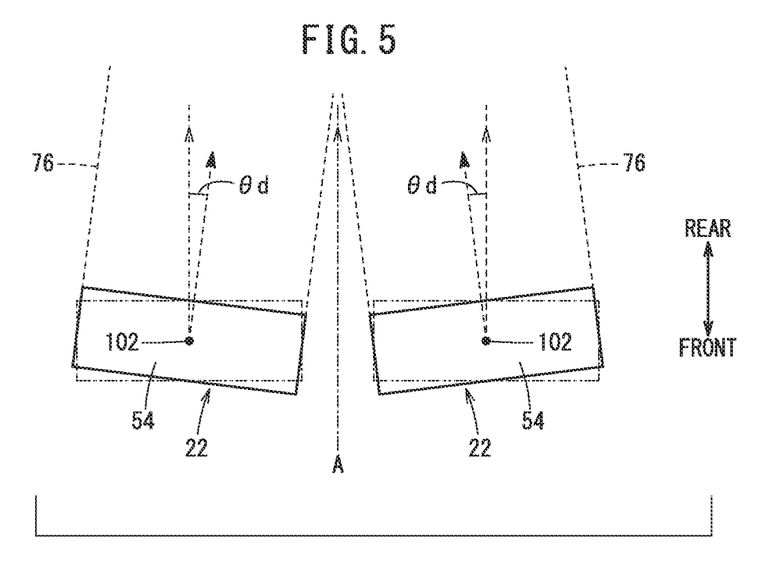
FIG. 5 is a diagram showing an example of airflow deflection.
Figure 6:
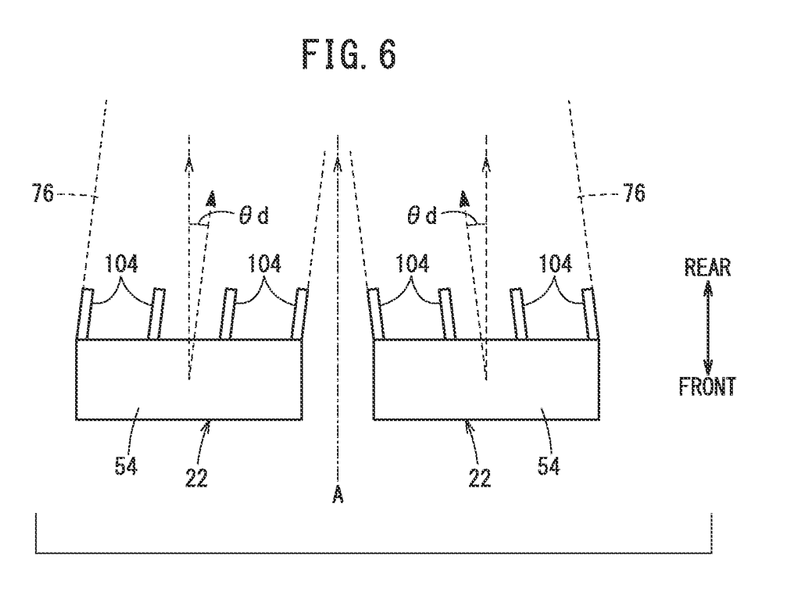
FIG. 6 is a diagram showing an example of airflow deflection.

The airflow deflection mechanism 88 includes the third motor 98 and a power transmission mechanism 100. The third motor 98 operates in accordance with the electric power supplied from the third driver 86. The power transmission mechanism 100 operates in accordance with the operation of the third motor 98 to change the azimuth θd of the second airflow 76. For example, as shown in FIG. 5, the power transmission mechanism 100 rotates the entire cruise rotor 22 or the duct 54 about an axis 102 parallel to the vertical direction. As shown in FIG. 6, the power transmission mechanism 100 may change the orientation of a flow straightening plate 104 extending rearward from the duct 54.

3. Operation of Airflow Deflection Device 78

Figure 7:
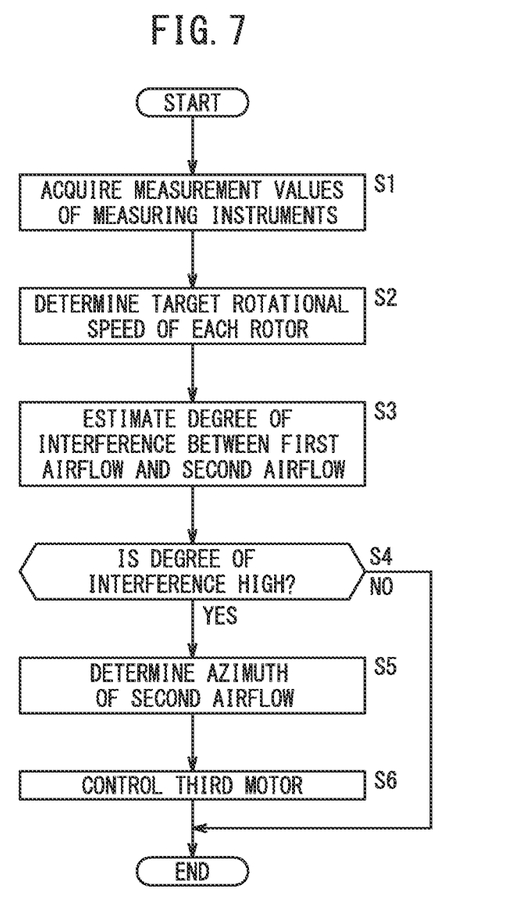
FIG. 7 is a flowchart showing the operation of the airflow deflection device.

FIG. 7 is a flowchart showing the operation of the airflow deflection device 78. The computation unit 90 of the controller 84 repeatedly performs the processing described below at predetermined time intervals. Although the operation of suppressing interference between the right first airflow 74 and the right second airflow 76 will be described below, the operation of suppressing interference between the left first airflow 74 and the left second airflow 76 is the same.

In step S1, the computation unit 90 acquires the measurement values of the measuring instruments.

In step S2, the computation unit 90 determines the target rotational speed R1 of each of the eight takeoff and landing rotors 20 and the target rotational speed R2 of each of the two cruise rotors 22, based on the acquired measurement values and the rotor control table 94. The computation unit 90 outputs a control command to each of the eight first drivers 62 based on each determined target rotational speed R1. As a result, each of the eight first motors 64 operates to rotate each of the eight takeoff and landing rotors 20. In addition, the computation unit 90 outputs a control command to each of the two second drivers 68 based on each determined target rotational speed R2. As a result, each of the two second motors 70 operates to rotate each of the two cruise rotors 22.

In step S3, the computation unit 90 estimates the degree of interference between the first airflow 74 and the second airflow 76. When the takeoff and landing rotors 20d and the cruise rotors 22 are used together, the computation unit 90 determines that there is a possibility that the first airflow 74 and the second airflow 76 interfere with each other. Specifically, when the target rotational speed R1 of the takeoff and landing rotor 20d is equal to or greater than a predetermined value and the target rotational speed R2 of the cruise rotor 22 is equal to or greater than a predetermined value, the computation unit 90 determines that there is a possibility that the first airflow 74 and the second airflow 76 interfere with each other. For example, the takeoff and landing rotors 20d and the cruise rotors 22 are used together in a stage in which the moving direction of the aircraft 10 is shifted from the upper side to the front side. The takeoff and landing rotors 20d and the cruise rotors 22 are used together in a stage in which the moving direction of the aircraft 10 is shifted from the front side to the lower side. In this case, the computation unit 90 uses the rotation angle θr of the third motor 98 as an index for determining the degree of interference. The computation unit 90 uses the measurement value of the rotation sensor 82 as the rotation angle θr. The computation unit 90 determines the magnitude of the degree of interference by comparing the latest rotation angle θr stored in the storage unit 92 with a predetermined threshold value.

When the rotation angle θr of the third motor 98 is less than the threshold value, the computation unit 90 estimates that the degree of interference is high. That is, when the azimuth θd of the second airflow 76 is small, the computation unit 90 estimates that the degree of interference is high. In this case (step S4: YES), the process transitions to step S5. On the other hand, when the rotation angle θr of the third motor 98 is equal to or greater than the threshold value, the computation unit 90 estimates that the degree of interference is low. That is, when the azimuth θd of the second airflow 76 is large, the computation unit 90 estimates that the degree of interference is low. In this case (step S4: NO), the process ends.

In step S5, the computation unit 90 determines the azimuth θd of the second airflow 76. The rotation angle θr of the third motor 98 is proportional to the azimuth θd. In other words, determining the rotation angle θr is synonymous with determining the azimuth θd. Therefore, the computation unit 90 determines the rotation angle θr of the third motor 98. Here, the computation unit 90 determines the rotation angle θr of the third motor 98 using the airflow deflection table 96. At this time, the computation unit 90 calculates the rotation angle θr using, as input values, the target rotational speed R1 of the takeoff and landing rotor 20d and the target rotational speed R2 of the cruise rotor 22 that are determined in step S2. The computation unit 90 may use the actual rotational speed as an input value instead of using the target rotational speed R1 and the target rotational speed R2 as input values. At the time of step S5, each of the target rotational speed R1 and the target rotational speed R2 is equal to or greater than a predetermined value. Therefore, the ratio (target rotational speed R2/target rotational speed R1) serving as the input parameter of the airflow deflection table 96 does not become 0. Further, the ratio (target rotational speed R2/target rotational speed R1) does not diverge.

In step S6, the computation unit 90 outputs a control command to the third driver 86 so that the rotation angle θr of the third motor 98 becomes the rotation angle θr determined in step S5. In this manner, the computation unit 90 controls the third motor 98 to set the azimuth θd of the second airflow 76 to a desired angle.

4. Transition Example of Azimuth θd

Figure 8A:
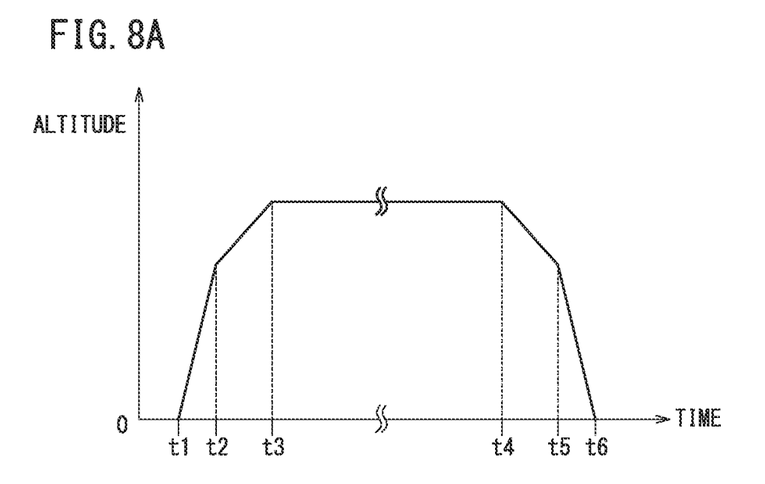
FIG. 8A is a diagram showing a lapse of time from takeoff to landing of the aircraft and a change in altitude.
Figure 8B:
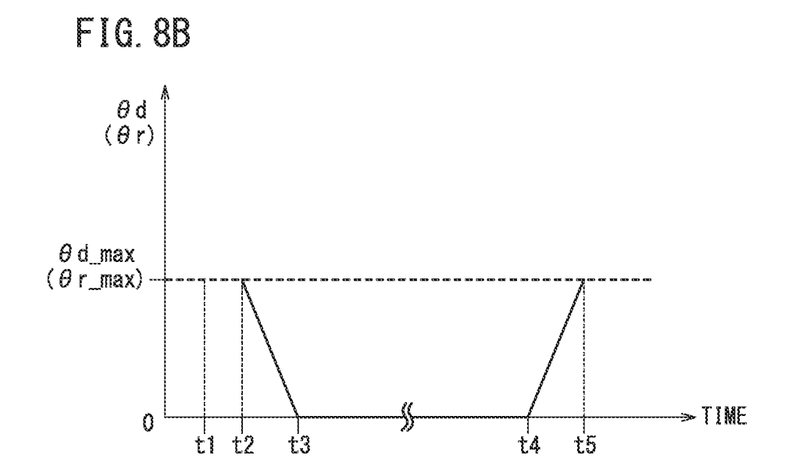
FIG. 8B is a diagram showing a lapse of time from takeoff to landing of the aircraft and a change in azimuth (rotation angle).

FIG. 8A is a diagram showing a lapse of time from takeoff to landing of the aircraft 10 and a change in the altitude of the aircraft 10. FIG. 8B is a diagram showing a lapse of time from takeoff to landing of the aircraft 10 and a change in the azimuth θd (rotation angle θr). As shown in FIG. 8A, the aircraft 10 takes off at time t1. The aircraft 10 climbs in the vertical direction at a constant speed from the time t1 to time t2. The moving direction of the aircraft 10 gradually changes from the vertical direction to the horizontal direction from the time t2 to time t3. The aircraft 10 cruises after the time t3. Further, the aircraft 10 cruises to time t4. The moving direction of the aircraft 10 gradually changes from the horizontal direction to the vertical direction from the time t4 to time t5. The aircraft 10 descends in the vertical direction at a constant speed from the time t5 to time t6. The aircraft 10 lands at the time t6.

For example, the takeoff and landing rotors 20d and the cruise rotors 22 are used together from the time t2 to the time t3. For example, the takeoff and landing rotors 20d and the cruise rotors 22 are used together from the time t4 to the time t5.

As shown in FIG. 8B, at the time t2, the computation unit 90 sets the rotation angle θr of the third motor 98 to a maximum angle θr_max. As a result, the azimuth θd of the second airflow 76 becomes a maximum angle θd_max. Here, the right-side cruise rotor 22 will be described as an example. The maximum angle θd_max is set within a range in which the second airflow 76 does not interfere with the first airflow 74 generated by the right-side takeoff and landing rotor 20. In addition, the maximum angle θd_max is set within a range in which the second airflow 76 does not interfere also with the first airflow 74 generated by the left-side takeoff and landing rotor 20. At the time t2, the computation unit 90 controls the third motor 98 so that the second airflow 76 moves away from the first airflow 74. Therefore, interference between the first airflow 74 and the second airflow 76 is suppressed.

From the time t2 to the time t3, the usage rate of the takeoff and landing rotors 20d gradually decreases as the aircraft climbs. Further, from the time t2 to the time t3, the usage rate of the cruise rotors 22 gradually increases as the aircraft climbs. Then, the moving speed of the aircraft in the horizontal direction gradually increases. In this case, R2/R1 gradually increases. Therefore, the computation unit 90 gradually decreases the rotation angle θr of the third motor 98. As a result, the azimuth θd of the second airflow 76 gradually decreases. That is, from the time t2 to the time t3, the computation unit 90 gradually brings the second airflow 76 close to the first airflow 74.

At the time t3, the azimuth θd is substantially 0. At this time point, the takeoff and landing rotors 20d are not in use. Alternatively, the takeoff and landing rotors 20d rotate at an extremely low speed. That is, the first airflow 74 is not substantially generated. Therefore, the first airflow 74 and the second airflow 76 do not interfere with each other.

At the time t4, the azimuth θd is substantially 0. At this time point, the takeoff and landing rotor 20d are substantially unused. That is, the first airflow 74 is not generated. Therefore, the first airflow 74 and the second airflow 76 do not interfere with each other.

From the time t4 to the time t5, the usage rate of the takeoff and landing rotors 20d gradually increases as the aircraft descends. Further, from the time t4 to the time t5, the usage rate of the cruise rotors 22 gradually decreases as the aircraft descends. Then, the moving speed of the aircraft in the horizontal direction gradually decreases. In this case, R2/R1 gradually decreases. Therefore, the computation unit 90 gradually increases the rotation angle θr of the third motor 98. As a result, the azimuth θd of the second airflow 76 gradually increases. That is, from the time t4 to the time t5, the computation unit 90 gradually moves the second airflow 76 away from the first airflow 74.

At the time t5, the computation unit 90 sets the rotation angle θr of the third motor 98 to the maximum angle θr_max. As a result, the azimuth θd of the second airflow 76 becomes the maximum angle θd_max. At the time t5, the computation unit 90 controls the third motor 98 so that the second airflow 76 moves away from the first airflow 74. Therefore, interference between the first airflow 74 and the second airflow 76 is suppressed.

5. Modification

In the above-described embodiment, the computation unit 90 continuously changes the azimuth θd of the second airflow 76 by continuously changing the rotation angle θr of the third motor 98. Aside from this, the computation unit 90 may change the azimuth θd of the second airflow 76 in a stepwise manner by changing the rotation angle θr of the third motor 98 in a stepwise manner. For example, when the takeoff and landing rotors 20d and the cruise rotors 22 are used together, the computation unit 90 may set the rotation angle θr to a predetermined angle. The computation unit 90 may set the rotation angle θr to 0 when the takeoff and landing rotors 20d and the cruise rotors 22 are not used together. In addition, the computation unit 90 may change the rotation angle θr according to the switch operation of the pilot.

In the above-described embodiment, the rotating shaft of the cruise rotor 22 is located below the blades 46 of the takeoff and landing rotor 20. Aside from this embodiment, the rotating shaft of the cruise rotor 22 may be located above the blades 46 of the takeoff and landing rotor 20. The rotating shaft of the cruise rotor 22 may be located at the same height as the blades 46 of the takeoff and landing rotor 20. In short, the present invention is applicable to the aircraft 10 having a structure in which air discharged from the cruise rotors 22 and air sucked into the takeoff and landing rotors 20 interfere with each other. Furthermore, the present invention is also applicable to the aircraft 10 having a structure in which air discharged from the cruise rotors 22 and air discharged from the takeoff and landing rotors 20 interfere with each other.

In step S3 shown in FIG. 7, the computation unit 90 may estimate the degree of interference based on the deviation between a target attitude and an actual attitude of the airframe. For example, there is a case where, even though a target value of the pitch angle is 0, the airframe is in the rearward inclined attitude. In this case, there is a possibility that the airflow of the cruise rotors 22 and the airflow of the takeoff and landing rotors 20d interfere with each other and the lift is not generated by the takeoff and landing rotors 20d as required. Therefore, when the deviation between the target value and an actual measurement value of the pitch angle is large, the computation unit 90 can estimate that the degree of interference is high.

6. Technical Idea Obtained from Embodiments

The technical idea that can be grasped from the above embodiment and modification will be described below.

According to an aspect of the present invention, provided is an aircraft 10 comprising: a fuselage 12; a wing (front wing 14, rear wing 16) connected to the fuselage 12; a plurality of takeoff and landing rotors 20 each configured to generate a first airflow 74 below the takeoff and landing rotor 20 in order for the aircraft 10 to perform vertical movement; and a cruise rotor 22 configured to generate a second airflow 76 behind the cruise rotor 22 in order for the aircraft 10 to perform forward movement, the plurality of takeoff and landing rotors 20 including a rear rotor (takeoff and landing rotor 20d) disposed behind the cruise rotor 22, the aircraft further comprising: an airflow deflection mechanism 88 configured to change a direction of the second airflow 76; and a controller 84 (computation unit 90) configured to control the airflow deflection mechanism 88 to suppress interference between the first airflow 74 generated by the rear rotor and the second airflow 76 during at least one of a transition from the vertical movement to the forward movement (from time t2 to time t3) or a transition from the forward movement to the vertical movement (from time t4 to time t5).

In the above configuration, when the rear rotor (takeoff and landing rotor 20d) and the cruise rotor 22 are used together, the controller 84 (computation unit 90) changes the direction of the second airflow 76 so that the second airflow 76 moves away from the position of the first airflow 74. Therefore, according to the above configuration, interference between the first airflow 74 and the second airflow 76 can be suppressed.

In the aspect of the present invention, the rear rotor (takeoff and landing rotor 20d) may be disposed so as to be separated from an axis (central axis A) of the fuselage 12 in one of left and right directions by a first distance, the cruise rotor 22 may be disposed so as to be separated from the axis of the fuselage 12 in the one of the left and right directions by a second distance smaller than the first distance, and the controller 84 (computation unit 90) may control the airflow deflection mechanism 88 to increase an azimuth θd of the second airflow 76 with respect to an axial direction of the fuselage 12 when suppressing the interference between the first airflow 74 and the second airflow 76, and control the airflow deflection mechanism 88 to decrease the azimuth θd of the second airflow 76 with respect to the axial direction as a speed of the forward movement increases.

According to the above configuration, the controller 84 (computation unit 90) decreases the azimuth θd of the second airflow 76 as the usage rate of the cruise rotor 22 increases. Therefore, the thrust generated by the cruise rotor 22 can be increased.

In the aspect of the present invention, the controller 84 (computation unit 90) may estimate a degree of the interference between the first airflow 74 and the second airflow 76, and determine the azimuth θd of the second airflow 76 with respect to the axial direction of the fuselage 12 in accordance with an estimation result.

In the aspect of the present invention, the controller 84 (computation unit 90) may determine the azimuth θd of the second airflow 76 with respect to the axial direction of the fuselage 12 in accordance with a rotational speed of the rear rotor (takeoff and landing rotor 20d) and a rotational speed of the cruise rotor 22.

In the aspect of the present invention, the airflow deflection mechanism 88 may include an actuator (third motor 98) configured to change an orientation of the cruise rotor 22.

In the aspect of the present invention, the airflow deflection mechanism 88 may include: a flow straightening plate 104 disposed behind the cruise rotor 22; and an actuator (third motor 98) configured to change an orientation of the flow straightening plate 104.

Note that the aircraft according to the present invention is not limited to the above-described embodiment and modification, and various configurations can be adopted therein without departing from the gist of the present invention.

What is claimed is:

1. An aircraft comprising:
a fuselage;
a wing connected to the fuselage;
a plurality of takeoff and landing rotors each configured to generate a first airflow below the takeoff and landing rotor in order for the aircraft to perform vertical movement;
a cruise rotor configured to generate a second airflow behind the cruise rotor in order for the aircraft to perform forward movement,
the plurality of takeoff and landing rotors including a rear rotor disposed behind the cruise rotor,
the aircraft further comprising:
an airflow deflection mechanism configured to change an azimuth of the second airflow with respect to an axial direction of the fuselage in a plan view; and
a controller configured to control the airflow deflection mechanism to suppress interference between the first airflow generated by the rear rotor and the second airflow during at least one of a transition from the vertical movement to the forward movement or a transition from the forward movement to the vertical movement, wherein
the rear rotor is disposed so as to be separated from an axis of the fuselage in one of left and right directions by a first distance,
the cruise rotor is disposed so as to be separated from the axis of the fuselage in the one of the left and right directions by a second distance smaller than the first distance, and
the controller is configured to:
control the airflow deflection mechanism to increase the azimuth of the second airflow with respect to the axial direction of the fuselage when suppressing the interference between the first airflow and the second airflow; and
control the airflow deflection mechanism to decrease the azimuth of the second airflow with respect to the axial direction as a speed of the forward movement increases.

2. The aircraft according to claim 1, wherein
the controller estimates a degree of the interference between the first airflow and the second airflow, and determines the azimuth of the second airflow with respect to the axial direction of the fuselage in accordance with an estimation result.

3. The aircraft according to claim 1, wherein
the controller determines the azimuth of the second airflow with respect to the axial direction of the fuselage in accordance with a rotational speed of the rear rotor and a rotational speed of the cruise rotor.

4. The aircraft according to claim 1, wherein
the airflow deflection mechanism includes an actuator configured to change an orientation of the cruise rotor.

5. The aircraft according to claim 1, wherein
the airflow deflection mechanism includes:
a flow straightening plate disposed behind the cruise rotor; and
an actuator configured to change an orientation of the flow straightening plate.

* * * * *